US007940538B2

(12) United States Patent
Kwon

(10) Patent No.: US 7,940,538 B2
(45) Date of Patent: May 10, 2011

(54) MULTI-VOLTAGE POWER SUPPLY

(75) Inventor: Bong-hwan Kwon, Pohang (KR)

(73) Assignee: SAMSUNG Electronics Co., Ltd., Suwon-si (KR)

( * ) Notice: Subject to any disclaimer, the term of this patent is extended or adjusted under 35 U.S.C. 154(b) by 0 days.

(21) Appl. No.: 12/690,273

(22) Filed: Jan. 20, 2010

(65) Prior Publication Data

US 2010/0118566 A1    May 13, 2010

Related U.S. Application Data

(63) Continuation of application No. 11/491,927, filed on Jul. 25, 2006, now Pat. No. 7,675,762.

(30) Foreign Application Priority Data

Jul. 26, 2005  (KR) .................................. 2005-67631
Jan. 11, 2006  (KR) .................................. 2006-3284
Jun. 28, 2006  (KR) .................................. 2006-58887

(51) Int. Cl.
*H02M 7/217*  (2006.01)

(52) U.S. Cl. ......................................... 363/89; 363/127
(58) Field of Classification Search ............... 363/16–20, 363/41, 55, 95, 97, 89, 127, 21.03, 21.06, 363/21.14; 323/222, 267, 288; 315/224, 315/307

See application file for complete search history.

(56) References Cited

U.S. PATENT DOCUMENTS

| | | | | |
|---|---|---|---|---|
| 5,500,721 A | * | 3/1996 | Randall et al. | 399/37 |
| 5,612,862 A | * | 3/1997 | Marusik et al. | 363/93 |
| 6,038,150 A | * | 3/2000 | Yee et al. | 363/89 |
| 6,130,828 A | * | 10/2000 | Rozman | 363/21.06 |

* cited by examiner

*Primary Examiner* — Rajnikant B Patel
(74) *Attorney, Agent, or Firm* — Stanzione & Kim, LLP

(57) ABSTRACT

A multi-voltage power supply includes a transformer, a first output circuit to generate a first output voltage using a voltage transferred to a secondary winding of the transformer, and a first output voltage controller to control a voltage supplied to the primary winding of the transformer according to the first output voltage. The multi-voltage power supply includes second through Nth output circuits to generate second through Nth output voltages using the voltage transferred to the secondary winding of the transformer, and second through Nth output voltage controllers performing control in order to linearly output the second through Nth output voltages by feeding back the second through Nth output voltages. Accordingly, multiple (at least two) output circuits, which are on the secondary winding side of the transformer, to realize multiple output voltages can be independently controlled, and in particular, by linearly controlling the multiple output circuits, the multiple output voltages can be stably controlled regardless of the number of output voltages.

30 Claims, 14 Drawing Sheets

MULTI-VOLTAGE POWER SUPPLY

CROSS-REFERENCE TO RELATED APPLICATIONS

This application a continuation of prior application Ser. No. 11/491,927, filed on Jul. 25, 2006 now U.S. Pat. No. 7,675,762, in the U.S. Patent and Trademark Office, which claims priority of Korean Patent Application No. 10-2005-0067631, filed on Jul. 26, 2005, in the Korean Intellectual Property Office, the benefit of Korean Patent Application No. 10-2006-0003284, filed on Jan. 11, 2006, in the Korean Intellectual Property Office, and the benefit of Korean Patent Application No. 10-2006-0058887, filed on Jun. 28, 2006, in the Korean Intellectual Property Office, the disclosure of which is incorporated herein in its entirety by reference.

BACKGROUND OF THE INVENTION

1. Field of the Invention

The present general inventive concept relates to a multi-voltage power supply, and more particularly, to a multi-voltage power supply to independently control multiple voltages using a simple structure.

2. Description of the Related Art

In general, devices, such as personal computers (PCs), printers, photocopiers, monitors, and communication terminals, require a heavy-duty power supply system having a simple structure, a small size, and consistent power supply capability. Current source type power supplies are generally used for this required heavy-duty power supply system.

FIG. 1 is a circuit diagram illustrating the basic operation of a current source type power supply called a "flyback converter," which is a type of direct current (DC)/DC converter.

Referring to FIG. 1, the flyback converter includes a transformer T having a predetermined winding ratio, a primary circuit 10 connected to the primary coil, i.e., the input coil, of the transformer T, and a secondary circuit 20 connected to the secondary coil, i.e., the output coil, of the transformer T. The primary circuit 10 and the secondary circuit 20 are isolated from each other by the transformer T.

The primary circuit 10 includes a control switch S connected in series between the primary coil of the transformer T and ground. The control switch S controls a stored energy or a transfer operation of the transformer T by switching an input voltage in response to a control signal input from an output voltage controller 30.

The secondary circuit 20 includes a rectifier 21 which is used to rectify a current transferred from the transformer T. The rectifier 21 includes a diode D and a capacitor C, which are connected in series, and together are connected in parallel to the secondary coil of the transformer T. An output terminal is formed at the both ends of the capacitor C. That is, an external load can be connected in parallel to the capacitor C. The secondary circuit 20 also can include a filter (not illustrated) for filtering high frequency noise and Electro Magnetic Interference (EMI) and an output voltage control circuit (not illustrated).

If the control switch S included in the primary circuit 10 is in an ON state (closed), a voltage having a polarity opposite to that of the primary coil of the transformer T is induced in the secondary coil, resulting in an inverse bias state of the diode D of the rectifier 21. Thus, a current flowing through the secondary circuit 20 is blocked, and energy is stored in the form of a magnetization inductance of the transformer T. That is, in an ON state (closed) of the control switch S, a current transfer by the transformer T is not performed, and the entire energy supplied to the primary coil is stored in the form of the magnetization inductance of the transformer T.

If the control switch S is in an OFF state (open), a voltage, having a polarity opposite to when the control switch S is in the OFF state (open), is induced in the secondary coil of the transformer T, resulting in an ON state of the diode D of the secondary circuit 20. Thus, a current due to the magnetization inductance of the transformer T is transferred to the secondary circuit 20, and a DC voltage rectified by the rectifier 21 is thereby output through the output terminal.

The output voltage controller 30 is connected to the output terminal of the secondary circuit 20. The output voltage controller 30 applies a control signal to the control switch S by feeding back the output voltage of the secondary circuit 20. The control signal acts as a signal for controlling a duty rate of the control switch S. Thus, the output voltage can be controlled by controlling the operation of the control switch S.

As described above, by using the magnetization inductance component of the transformer T as a boost inductor, the flyback converter stores energy in the form of the magnetization inductance of the transformer T when the control switch S included in the primary circuit 10 is in the OFF state, and supplies the rectified DC voltage by transferring the current, due to the change in magnetization inductance, to the secondary coil of the transformer T when the control switch S is in the ON state.

Thus, in terms of the secondary circuit 20, since the transformer T acts as a current source for supplying a current periodically, each power supply having this principle is called a current source type power supply. Various other types of current source type power supplies, besides the flyback converter, exist, according to various circuit configurations added to a primary circuit.

Since such a current source type power supply has a secondary circuit with a simpler rectifier structure and less components compared to other type power supplies, the current source type power supply has an advantage when used to output multiple voltages. That is, since secondary circuits corresponding to the multiple voltages must be included, if the secondary circuits have a simple structure, a total size of a power supply can be reduced.

Due to this advantage, various current source type multi-voltage power supplies have been suggested. However, since conventional current source type multi-voltage power supplies use a plurality of transformers and a plurality of inefficient regulator chips to control output voltages of secondary circuits, and/or have a complex structure in which an output voltage feedback circuit of each secondary circuit is connected to a primary circuit, the advantage of the current source type power supplies cannot be properly utilized.

SUMMARY OF THE INVENTION

The present general inventive concept provides a multi-voltage power supply having a simple structure and a significantly small size, which includes a plurality of output circuits on a secondary winding side of a transformer, whereby an output voltage of each of the output circuits is controlled independently.

Additional aspects and utilities of the present general inventive concept will be set forth in part in the description which follows and, in part, will be obvious from the description, or may be learned by practice of the general inventive concept.

The foregoing and/or other aspects and utilities of the present general inventive concept are achieved by providing a multi-voltage power supply including a transformer, a first output circuit to generate a first output voltage using a voltage transferred to a secondary winding side of the transformer, and a first output voltage controller to control a voltage supplied to a primary winding of the transformer according to the first output voltage, the multi-voltage power supply including: second through $N^{th}$ output circuits to generate second through $N^{th}$ output voltages, respectively, using the voltage transferred to the secondary winding of the transformer; and second through $N^{th}$ output voltage controllers to control linearly outputting the second through $N^{th}$ output voltages, respectively, by feeding back the second through $N^{th}$ output voltages.

The foregoing and/or other aspects and utilities of the present general inventive concept are also achieved by providing a multi-voltage power supply including a transformer, a first output circuit to generate a first output voltage using a voltage transferred to a secondary winding of a transformer, and a first output voltage controller to control a voltage supplied to a primary winding of the transformer according to the first output voltage, the multi-voltage power supply including: second through $N^{th}$ output circuits to generate second through $N^{th}$ output voltages, respectively, using the voltage transferred to the secondary winding of the transformer; and second through $N^{th}$ output voltage controllers to control outputting the second through $N^{th}$ output voltages, respectively, according to a switching operation by feeding back the second through $N^{th}$ output voltages.

The foregoing and/or other aspects and utilities of the present general inventive concept are also achieved by providing a method of providing a multi-voltage power supply using a transformer, the method including generating a first output voltage using a voltage transferred to a secondary winding of the transformer; controlling a voltage supplied to a primary winding of the transformer according to the first output voltage; generating second through $N^{th}$ output voltages using the voltage transferred to the secondary winding of the transformer; and controlling to linearly output the second through $N^{th}$ output voltages by feeding back the second through $N^{th}$ output voltages.

The foregoing and/or other aspects and utilities of the present general inventive concept are also achieved by providing a method of providing a multi-voltage power supply using a transformer, the method including generating a first output voltage using a voltage transferred to a secondary winding of the transformer; controlling a voltage supplied to a primary winding of the transformer according to the first output voltage; generating second through $N^{th}$ output voltages using the voltage transferred to the secondary winding of the transformer; and controlling outputting the second through $N^{th}$ output voltages according to a switching operation by feeding back the second through $N^{th}$ output voltages.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which.

DETAILED DESCRIPTION OF THE PREFERRED EMBODIMENTS

Figure 1:
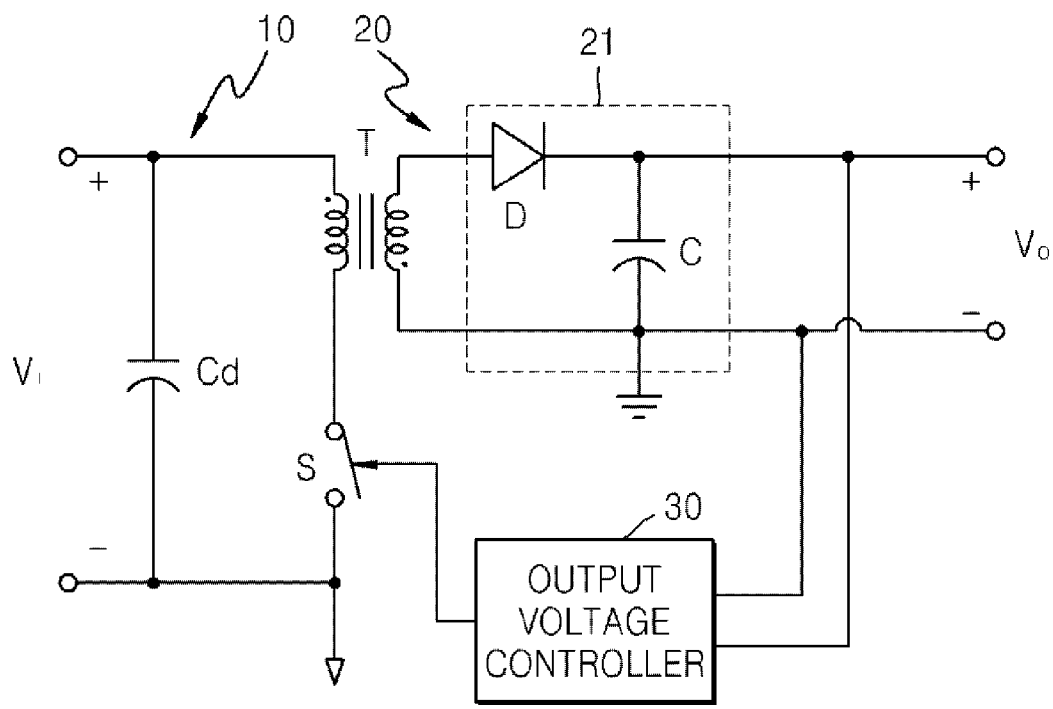
FIG. 1 is a circuit diagram illustrating a basic operation of a conventional current source type power supply.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

Figure 2:
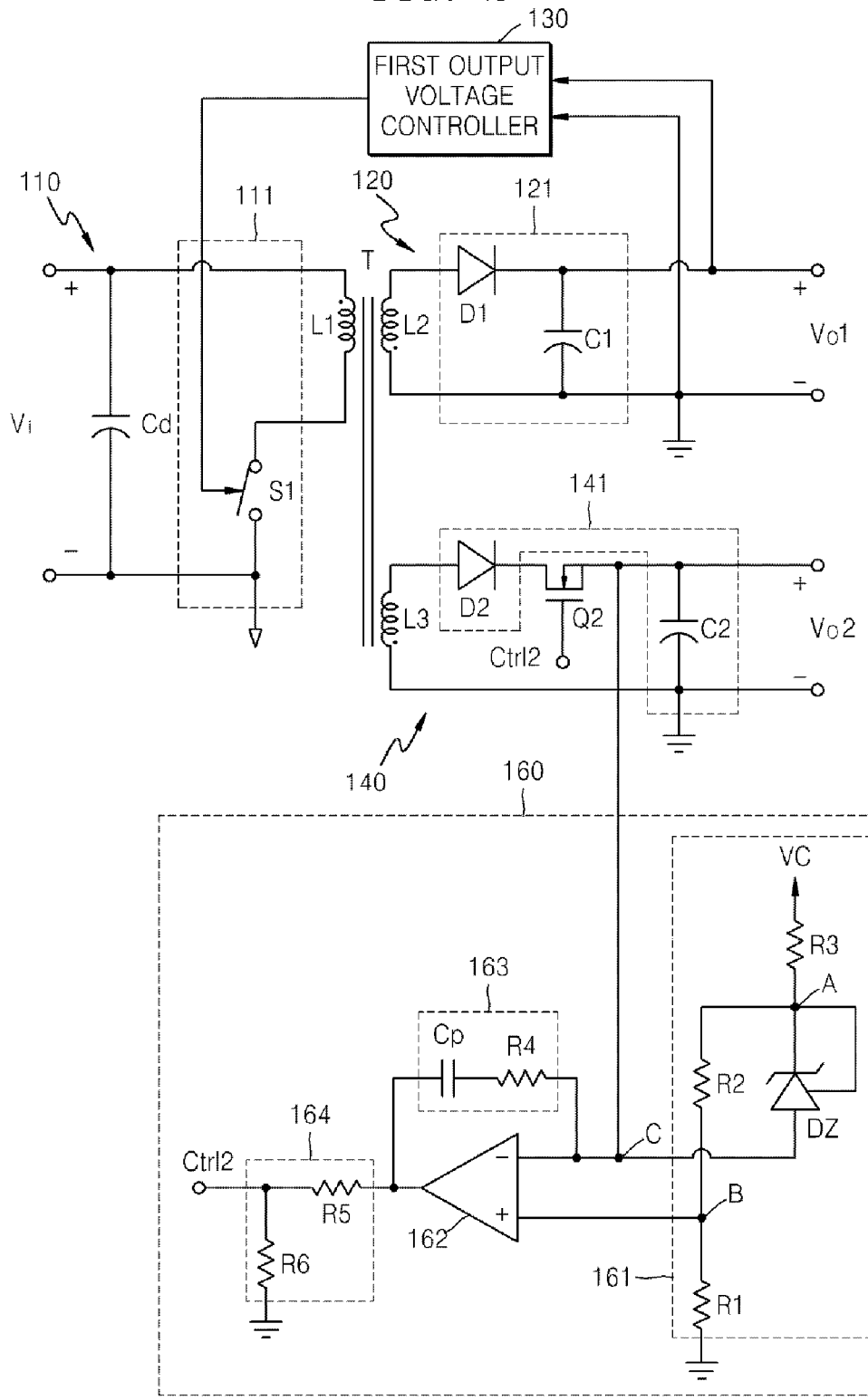
FIG. 2 is a circuit diagram of a multi-voltage power supply according to an embodiment of the present general inventive concept.

FIG. 2 is a circuit diagram of a multi-voltage power supply, i.e., a current source type two-voltage power supply, according to an embodiment of the present general inventive concept. Although a two-voltage power supply is described in the current embodiment, a multi-voltage power supply can be configured to output N (N is a natural number) output voltages according to an implementation environment. If the number of output voltages is N, a transformer includes N secondary coils, and a secondary output circuit can be connected to each of the N secondary coils.

Referring to FIG. 2, the multi-voltage power supply includes a transformer T having a primary coil L1 and two secondary coils, i.e., a first coil L2 and a second coil L3, forming predetermined winding ratios with the primary coil L1. A primary circuit 110 is connected to the primary coil L1, a first output circuit 120 is connected to the first coil L2 in the secondary winding, and a second output circuit 140 is connected to the second coil L3 in the secondary winding. The primary circuit 110 is isolated from the first and second output circuits 120 and 140 of the secondary winding by the transformer T.

The primary circuit 110 includes a current source type switching circuit 111 connected to the primary coil L1 of the transformer T. The current source type switching circuit 111 controls a stored energy or transfer operation of the transformer T by performing a switching operation in response to a first control signal applied by a first output voltage controller 130.

The current source type switching circuit 111 can include a first control switch S1 connected between the primary coil L1 of the transformer T and ground.

If the first control switch S1 is in an ON state (closed), a voltage having a polarity opposite to that of the primary coil L1 of the transformer T is induced in the secondary coils L2 and L3, resulting in an inverse bias state of diodes D1 and D2 included in the first and second output circuits 120 and 140, and accordingly, currents flowing through the first and second output circuits 120 and 140 are blocked, and energy is stored in the form of a magnetization inductance of the transformer T.

If the first control switch S1 is in an OFF state (open), a voltage having a polarity opposite to when the first control switch S1 is in the OFF state (open), is induced to the secondary coils L2 and L3 of the transformer T, resulting in an ON state of the diodes D1 and D2 included in the first and second output circuits 120 and 140, and accordingly, a current due to the magnetization inductance of the transformer T is transferred to the first and second output circuits 120 and 140.

The first output circuit 120 generates a first output voltage $V_{o1}$ by rectifying a voltage transferred to the secondary winding of the transformer T. For the rectification, the first output circuit 120 includes a first rectifier 121 to rectify the voltage. The first rectifier 121 illustrated in FIG. 2 is a half-wave rectifier. In the present embodiment, the first output circuit 120 may include a half-wave or full-wave rectifier.

The first rectifier 121 can include the first diode D1 and a first capacitor C1, which are connected in series, and together are connected in parallel to the first coil L2 in the secondary winding of the transformer T. In this case, a first output terminal used to output the first output voltage $V_{o1}$ can be formed at both ends of the first capacitor C1.

The first output voltage controller 130 can control a voltage supplied to the primary winding of the transformer T according to the first output voltage $V_{o1}$ generated by the first output circuit 120. The first output voltage controller 130 applies the first control signal to the first control switch S1 by feeding back the first output voltage $V_{o1}$. Herein, the first control signal indicates a signal to control a duty rate of the first control switch.

The second output circuit 140 generates a second output voltage $V_{o2}$ by rectifying the voltage transferred from the transformer T. For the rectification, the second output circuit 140 includes a second rectifier 141 and a second switch Q2.

The second rectifier 141 can include the second diode D2 and a second capacitor C2, which are connected in series, and together are connected in parallel to the second coil L3 in the secondary winding of the transformer T, in order to generate the second output voltage $V_{o2}$ by rectifying the voltage transferred from the transformer T. In this case, a second output terminal used to output the second output voltage $V_{o2}$ can be formed at both ends of the second capacitor C2.

The second switch Q2 linearly switches an operation of the second rectifier 141 in an active region in response to a linear control signal Ctrl2 applied from a second output voltage controller 160. For the switching operation, the second switch Q2 is disposed between the second diode D2 and the second capacitor C2. The second switch Q2 can be implemented using a metal oxide semiconductor field effect transistor (MOSFET), a gate of which is connected to an output terminal of the second output voltage controller 160, or a bipolar junction transistor (BJT). If the second switch Q2 is implemented using a MOSFET, the second switch Q2 linearly switches an operation of the second rectifier 141 by receiving the linear control signal Ctrl2 through the gate of the MOSFET.

Figure 3:
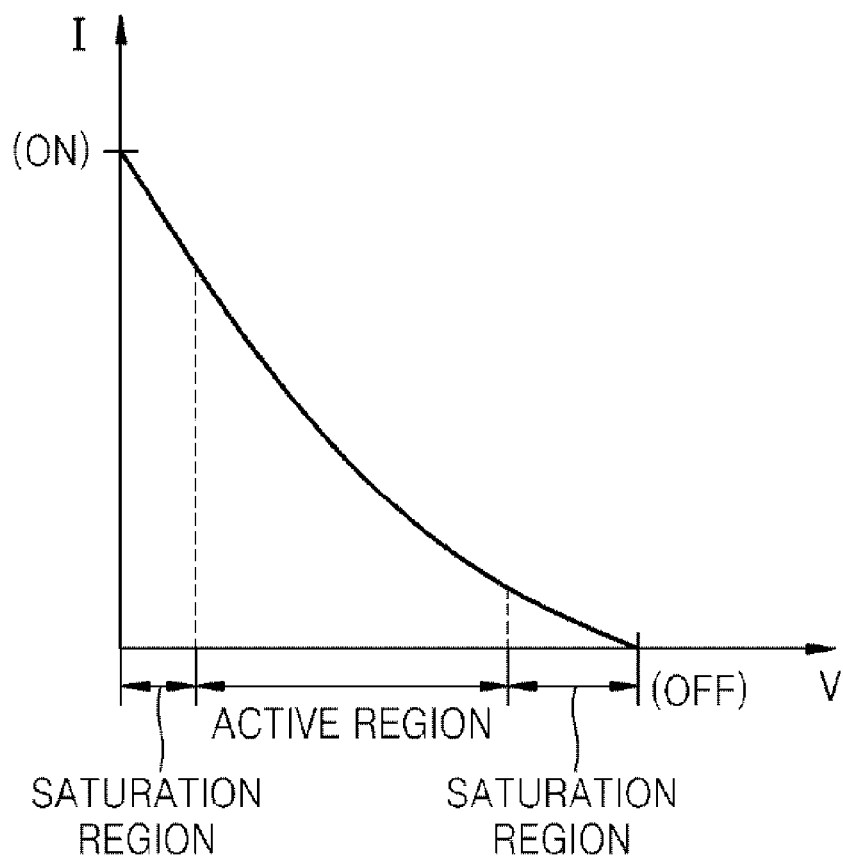
FIG. 3 is a graph illustrating a linear switching operation of a second switch of the multi-voltage power supply of FIG. 2, according to an embodiment of the present general inventive concept.

FIG. 3 is a graph illustrating a linear switching operation of the second switch Q2 of the multi-voltage power supply of FIG. 2, according to an embodiment of the present general inventive concept. If it is assumed that a current flowing through the second switch Q2 is I and a voltage across the second switch Q2 is V, a correlation illustrated in FIG. 3 is formed between the current I and the voltage V. Referring to FIG. 3, the second switch Q2 performs a switching operation in an active region, i.e., a region in which a curve becomes linear, not in a saturation region. The switching operation in the active region is called a linear switching operation.

The second output voltage controller 160 linearly controls the second output voltage $V_{o2}$ independently of the first output voltage controller 130 by generating the linear control signal Ctrl2 to control the second switch Q2 operating in the active region by feeding back the second output voltage $V_{o2}$ and applying the generated linear control signal Ctrl2 to the second switch Q2.

The second output voltage controller 160 can include a reference voltage generator 161, an error detector 162, a compensation circuit 163, and a control signal output unit 164.

The reference voltage generator 161 generates a reference voltage to be compared to the second output voltage $V_{o2}$ and outputs the generated reference voltage to the error detector 162. The reference voltage generator 161 can include a first reference voltage generator, which is connected to a predetermined voltage source $V_c$ and generates a first reference voltage, and a voltage divider circuit to generate a second reference voltage by voltage-dividing the first reference voltage.

The first reference voltage generator includes a third resistor R3 connected to the voltage source $V_c$ and a zener diode DZ. At a node A, the first reference voltage (i.e., a value obtained by adding a predetermined voltage, e.g., 2.5 V, to the second output voltage $V_{o2}$) can be generated by the third resistor R3 and the zener diode DZ. That is, a voltage generated at the node A is $V_{o2}+2.5$ V.

The voltage divider circuit includes a first resistor R1 and a second resistor R2, which voltage-divide the first reference voltage generated by the first reference voltage generator. At a node B located between the first resistor R1 and the second resistor R2, the second reference voltage having a value "$(V_{o2}+2.5) \times (R1/(R1+R2))$" according to a voltage dividing formula is generated. The generated second reference voltage is input to a first input terminal of the error detector 162.

Thus, the second reference voltage is input to the first input terminal of the error detector 162, and the second output voltage $V_{o2}$ is input to a second input terminal of the error detector 162. The error detector 162 compares the input second reference voltage and second output voltage $V_{o2}$ and outputs a difference value, i.e., an error value.

The error detector 162 can be realized using a comparator. In this case, since two input terminals of the comparator are in a virtual short state, the voltage at the node B can be considered in a normal state the same as a voltage at a node C, which is the second output voltage $V_{o2}$. Thus, since the voltage at the node B is the same as the voltage at the node C, Equation 1 can be realized as provided below.

$$V_{o2}=(V_{o2}+2.5) \times (R1/(R1+R2)) \quad (1)$$

Thus, the second output voltage $V_{o2}$ can be simplified to Equation 2 as provided below.

$$V_{o2}=2.5 \times (R1/R2) \quad (2)$$

That is, the second output voltage $V_{o2}$ to be controlled can be determined by a zener value and resistances of the first and second resistors R1 and R2.

The compensation circuit 163 stabilizes the second output voltage controller 160 by providing a compensation circuit for negative feedback. The compensation circuit 163 may include a fourth resistor R4 and a capacitor $C_p$ connected in series with each other, which are together connected in parallel to the second input terminal and an output terminal of the error detector 162.

The control signal output unit 164 outputs the second control signal Ctrl2 by voltage-dividing an error value output from the error detector 162 in order to linearly control the second switch Q2 operating in the active region. The control signal output unit 164 can include fifth and sixth resistors R5 and R6 for voltage-dividing the error value. Thus, the linear control signal Ctrl2 output through the control signal output unit 164 can be presented using Equation 3 provided below.

$$Ctrl2=V_{err} \times (R6/(R5+R6)) \quad (3)$$

Herein, $V_{err}$ denotes the error value output from the error detector 162.

Thus, a gate voltage of the second switch Q2 has a value "$V_{err} \times (R6/(R5+R6))$". Appropriate values for the resistances of the fifth and sixth resistors R5 and R6 can be determined in order for the second switch Q2 to operate in the active region. Thus, the gate voltage of the second switch Q2 varies in the active region according to the error value output from the error detector 162, thereby varying an equivalent drain-source resistance of the second switch Q2.

Figure 4:
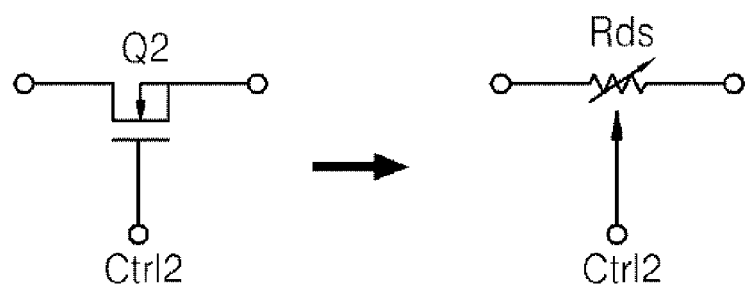
FIG. 4 is an equivalent circuit diagram of the second switch of the multi-voltage power supply of FIG. 2, which is controlled according to a variation of a linear control signal, according to an embodiment of the present general inventive concept.

FIG. 4 is an equivalent circuit diagram of the second switch Q2 of the multi-voltage power supply of FIG. 2, which is controlled according to a variation of the linear control signal Ctrl2, according to an embodiment of the present general inventive concept. As illustrated in FIG. 4, the second switch Q2 can be represented by a variable resistor $R_{ds}$, the resistance of which varies according to the linear control signal Ctrl2. Thus, since a current flowing through the second diode D2 varies in response to the linear control signal Ctrl2 varying according to a variation of the second output voltage $V_{o2}$, the second output voltage $V_{o2}$ can be controlled.

The multi-voltage power supply according to the embodiments of the present general inventive concept can use various type circuits. For example, a current source type switching circuit of a primary circuit can be configured using an active clamp flyback type, a half-bridge flyback type, or a series resonance type, besides the flyback type illustrated in FIG. 2. Thus, in the embodiments described below, multi-voltage power supplies, in which each of these various current source type switching circuits is applied to a primary circuit, will be described.

Figure 5:
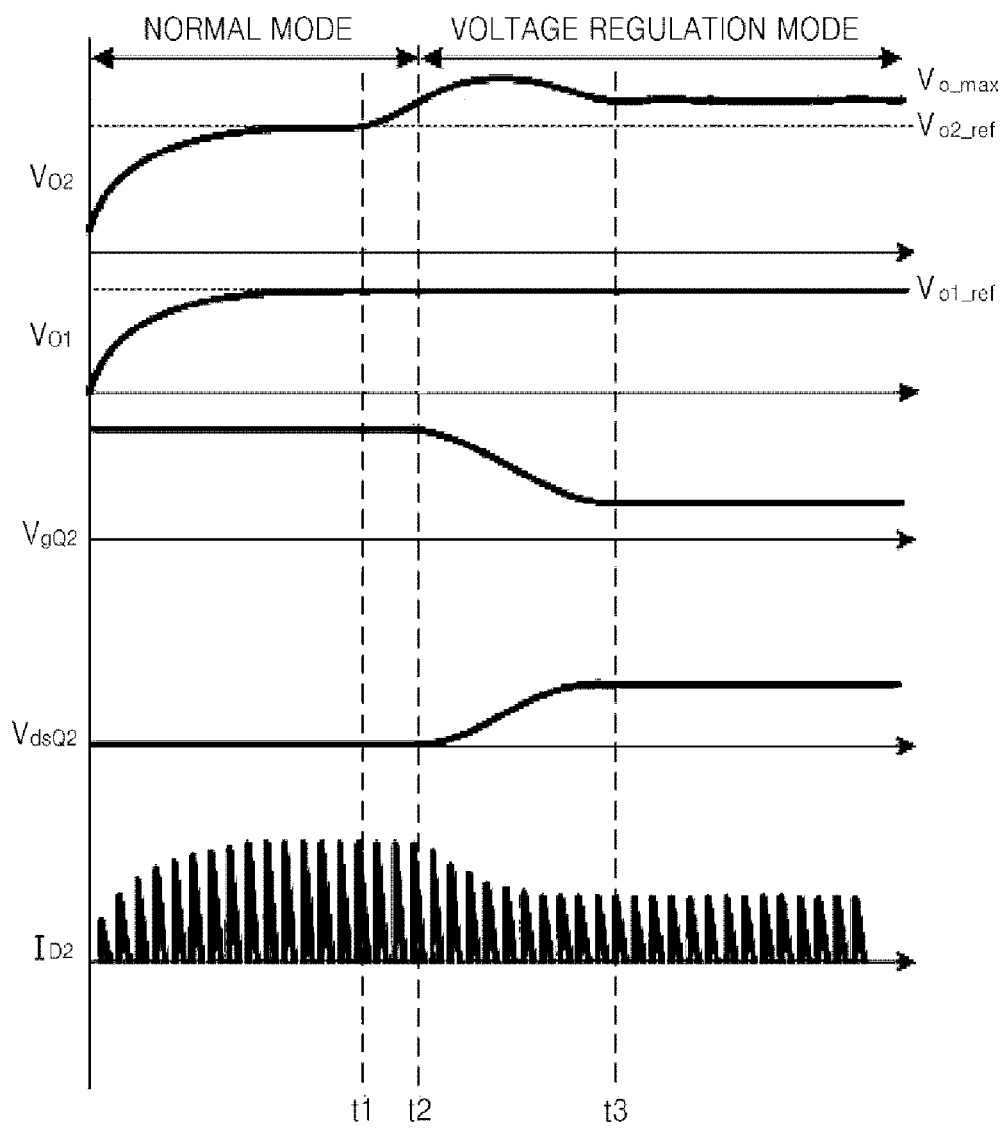
FIG. 5 is a timing diagram illustrating signal transitions according to an operation of the multi-voltage power supply of FIG. 2, according to an embodiment of the present general inventive concept.

FIG. 5 is a timing diagram illustrating signal transitions according to an operation of the multi-voltage power supply of FIG. 2, according to an embodiment of the present general inventive concept. Referring to FIG. 5, if a load on the side of the second output circuit 140 decreases at a time t2, the second output voltage $V_{o2}$ exceeds a maximum limit voltage $V_{o\_max}$. At this time, the linear control signal Ctrl2 of the second output voltage controller 160 is the same as the gate voltage $V_{gQ2}$ of the second switch Q2 and controls the second output voltage $V_{o2}$ by decreasing the gate voltage $V_{gQ2}$ so that the second switch Q2 operates in the active region. That is, like $V_{dSQ2}$, which is the voltage across the second switch Q2, the second switch Q2 acts as a variable resistor by causing a constant voltage decrease from the time t2. In FIG. 5, $I_{D2}$ denotes the current flowing through the second diode D2.

Figure 6:
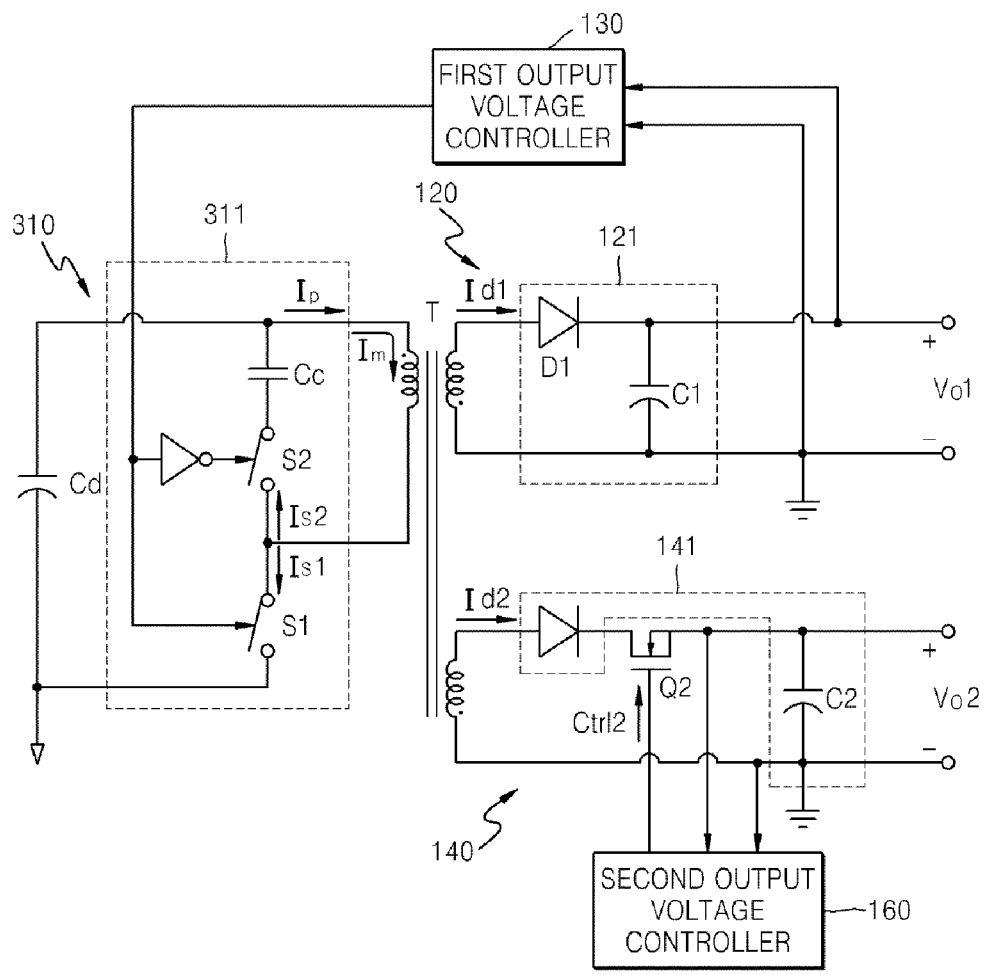
FIG. 6 is a circuit diagram of a multi-voltage power supply according to another embodiment of the present general inventive concept.

FIG. 6 is a circuit diagram of a multi-voltage power supply according to another embodiment of the present general inventive concept. In FIG. 6, a current source type switching circuit 311 is configured as the active clamp flyback type.

The current source type switching circuit 311 of a primary circuit 310 illustrated in FIG. 6 has a structure to which an active snubber circuit, which is used to prevent a switching loss due to a leakage inductance of a transformer T, is added.

That is, the current source type switching circuit 311 is connected in parallel to a primary coil of the transformer T and includes a capacitor $C_c$ and a second control switch S2 connected in series. Herein, the second control switch S2 and a first control switch S1 operate complementarily and have a short dead time.

If the first control switch S1 is in an ON state, energy is stored in the transformer T, and if the first control switch S1 is in an OFF state, the energy stored in the transformer T is transferred to first and second output circuits 120 and 140 on a secondary winding side of the transformer T. The energy stored in the form of a leakage inductance and a magnetization inductance of the transformer T allows the second control switch S2 and the first control switch S1 to perform zero voltage switching. In addition, the capacitor $C_c$ connected in series with the second control switch S2 resonates with the leakage inductance of the transformer T while a current flows through the secondary winding of the transformer T.

Figure 7:
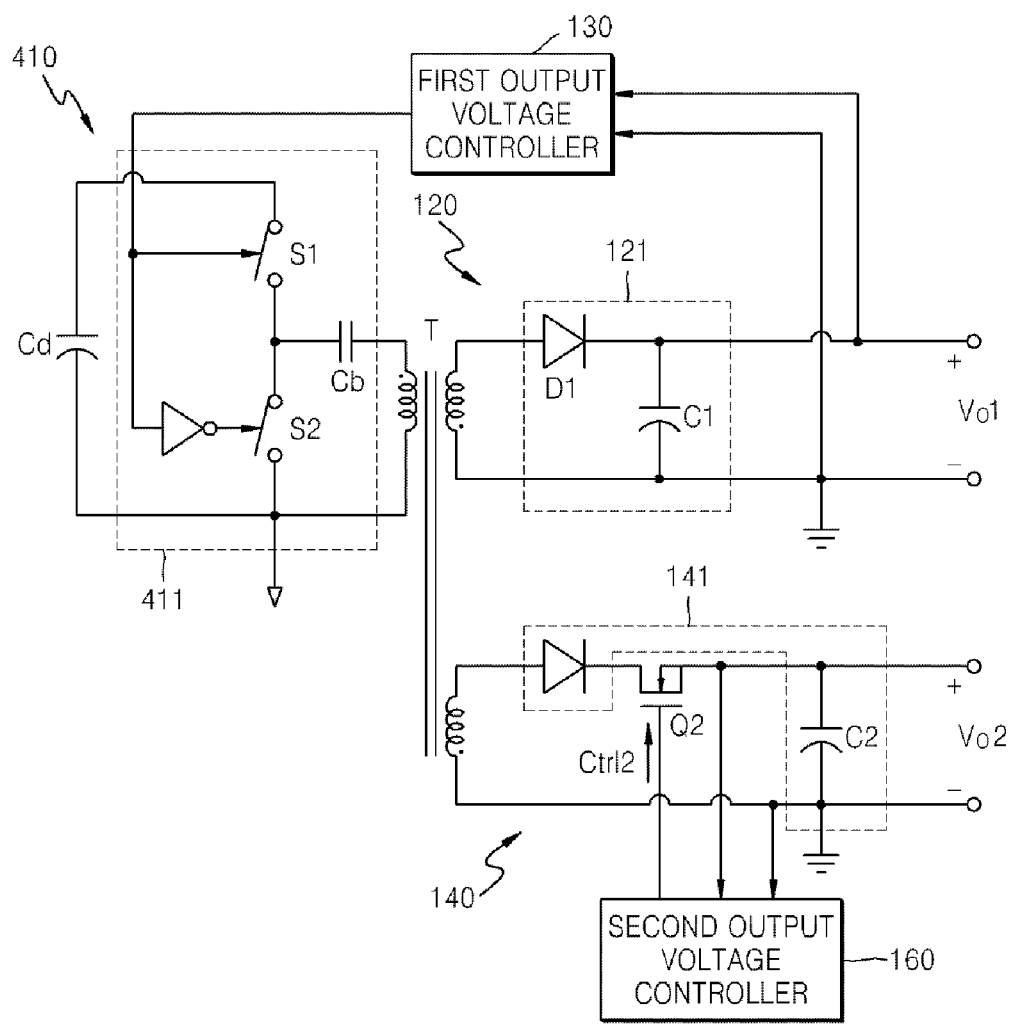
FIG. 7 is a circuit diagram of a multi-voltage power supply according to another embodiment of the present general inventive concept.

FIG. 7 is a circuit diagram of a multi-voltage power supply according to another embodiment of the present general inventive concept. In FIG. 7, a current source type switching circuit 411 is configured as the half-bridge flyback type.

The current source type switching circuit 411 of a primary circuit 410 illustrated in FIG. 7 can include a first control switch S1 and a second control switch S2. The first control switch S1 and the second control switch S2 operate complementarily and have a short dead time. If the first control switch S1 is in an ON state, energy is stored in a transformer T, and if the first control switch S1 is in an OFF state, the energy stored in the transformer T is transferred to first and second output circuits 120 and 140 on a secondary winding side of the transformer T.

In addition, a capacitor $C_b$ connected in series with a primary coil of the transformer T charges or discharges energy according to a direction of a current flowing through the primary coil of the transformer T and resonates with a leakage inductance of the transformer T while a current flows through the secondary winding of the transformer T.

Figure 8:
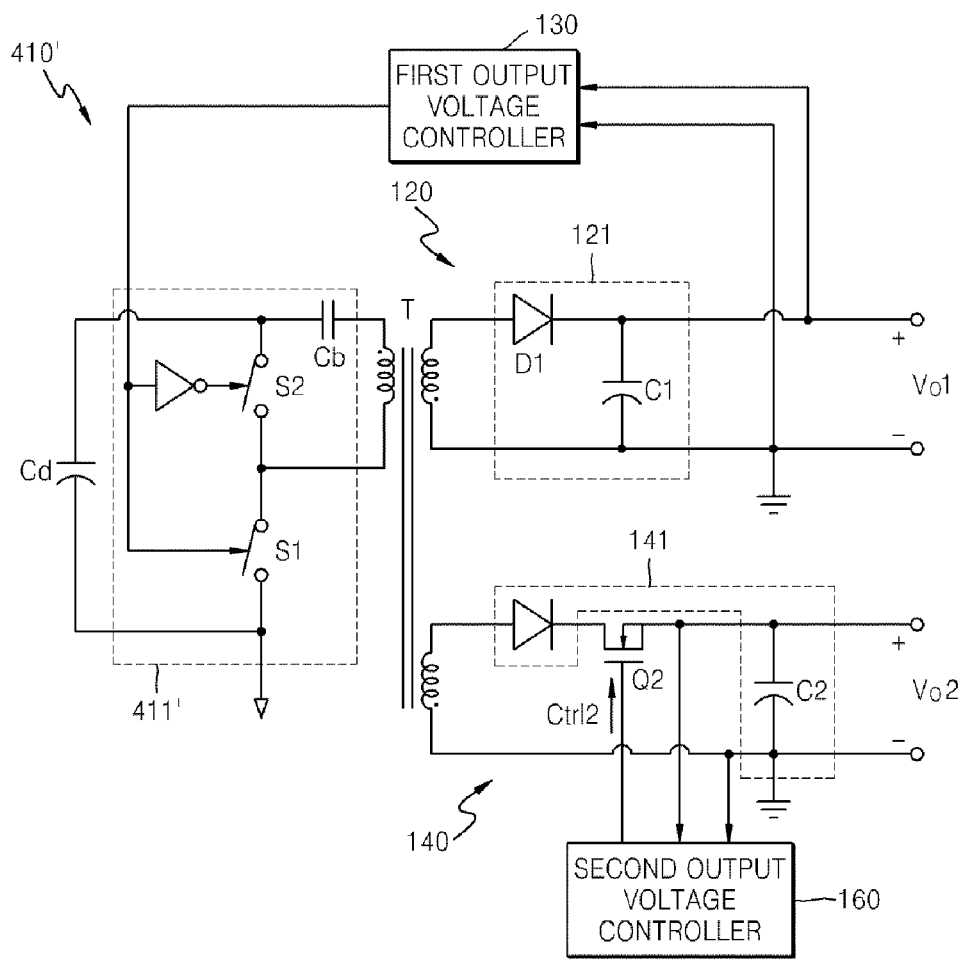
FIG. 8 is a circuit diagram of a different type of multi-voltage power supply, which can be derived from the multi-voltage power supply of FIG. 7, according to an embodiment of the present general inventive concept.

FIG. 8 is a circuit diagram of a different type of multi-voltage power supply, which can be derived from the multi-voltage power supply of FIG. 7, according to an embodiment of the present general inventive concept. Since an operation of a current source type switching circuit 411' of a primary circuit 410' illustrated in FIG. 8 is almost the same as that of the current source type switching circuit 411 illustrated in FIG. 7, a detailed description is omitted.

Figure 9:
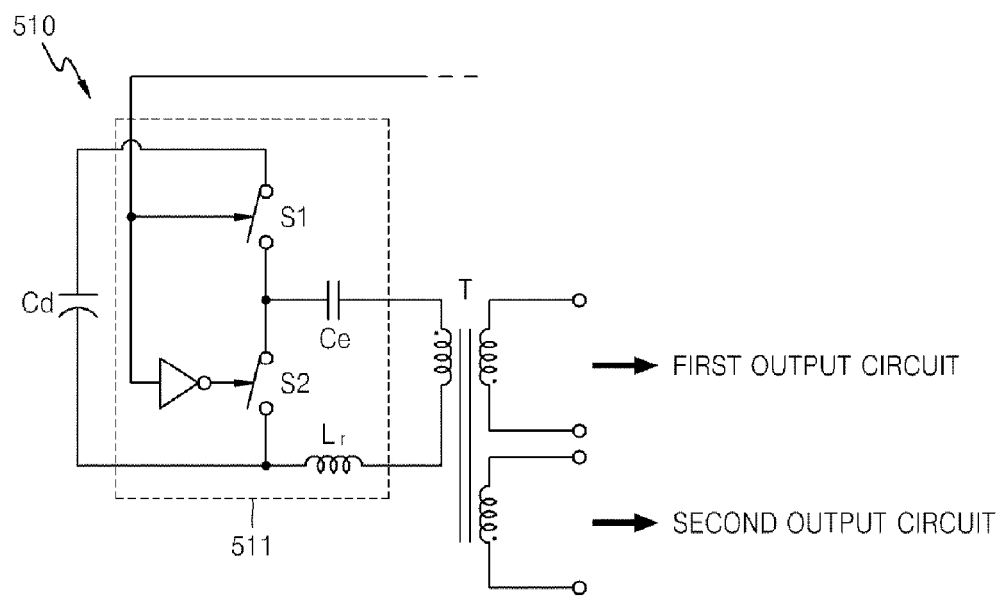
FIG. 9 is a circuit diagram of a multi-voltage power supply according to another embodiment of the present general inventive concept.

FIG. 9 is a circuit diagram of a multi-voltage power supply according to another embodiment of the present general inventive concept. In FIG. 9, a current source type switching circuit 511 is configured as the series resonance type. Referring to FIG. 9, the current source type switching circuit 511 of a primary circuit 510 can include a first control switch S1 and a second control switch S2. The first control switch S1 and the second control switch S2 operate complementarily and have a short dead time. In addition, an inductor $L_r$ connected in series with a capacitor $C_e$ corresponds to a leakage inductance of the transformer T or an additional inductor in the outside of the transformer T.

While the first control switch S1 is in an ON or OFF state, the capacitor $C_e$ and the inductor $L_r$ resonate with each other, and energy is transferred to the circuits on the secondary winding side by the transformer T operating as a current source.

Figure 10:
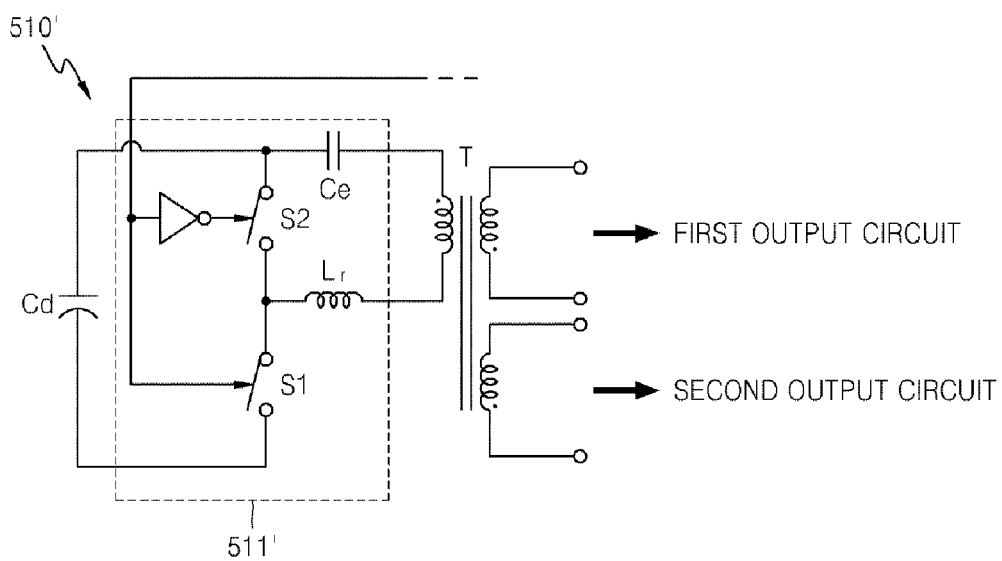
FIG. 10 is a circuit diagram of a different type of multi-voltage power supply, which can be derived from the multi-voltage power supply of FIG. 9, according to an embodiment of the present general inventive concept.

FIG. 10 is a circuit diagram of a different type of multi-voltage power supply, which can be derived from the multi-voltage power supply of FIG. 9, according to an embodiment of the present general inventive concept.

In the above embodiments, multi-voltage power supplies having various current source type switching circuits are described. A multi-voltage power supply having a full-wave rectification circuit, in which a first output circuit on a secondary winding side of a transformer can perform full-wave rectification, will now be described.

Figure 11:
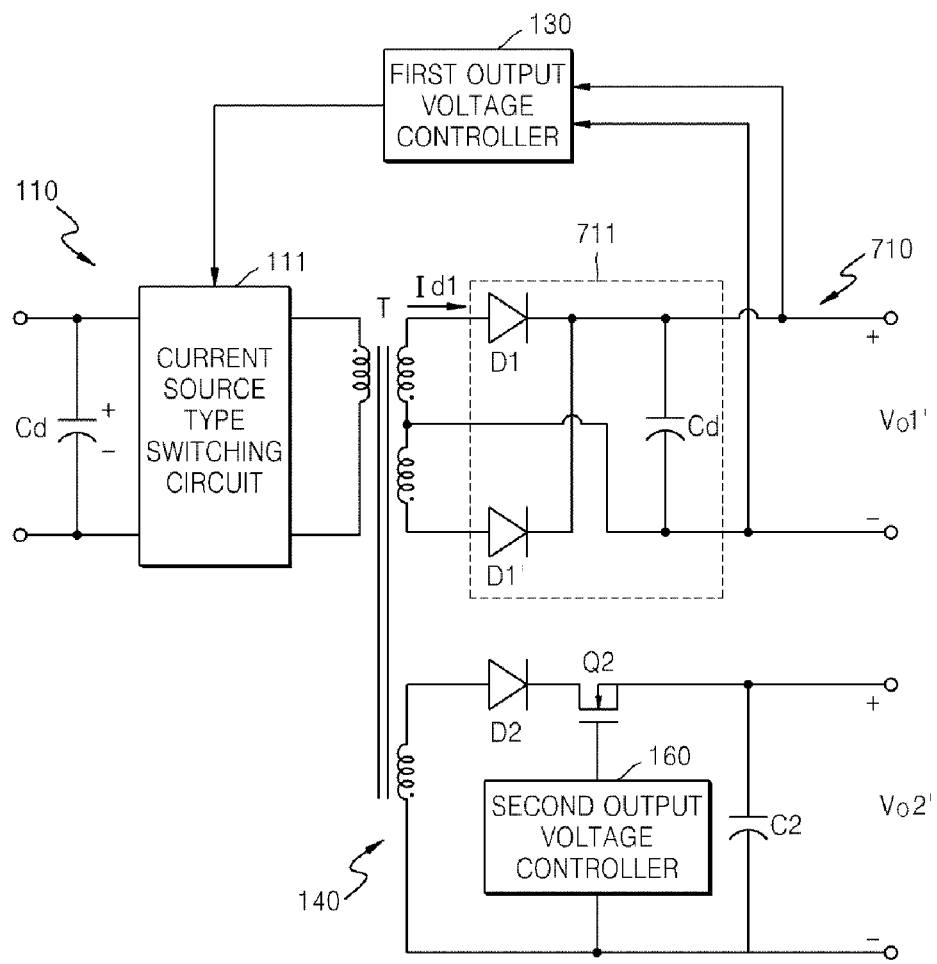
FIG. 11 is a circuit diagram of a multi-voltage power supply according to another embodiment of the present general inventive concept.

FIG. 11 is a circuit diagram of a multi-voltage power supply according to another embodiment of the present general inventive concept. Referring to FIG. 11, a first output circuit 710 includes a full-wave rectifier 711.

The first output circuit 710 has two current paths in order to perform full-wave rectification on a current transferred from a transformer T, and the current paths respectively include diodes D1 or D1'. Thus, the current paths perform rectification by alternatively conducting according to switching performed by a current source type switching circuit 111, thereby outputting a full-wave rectified first output voltage $V_{o1}'$.

In the above-described embodiments, each of the multi-voltage power supplies can independently control a plurality of output circuits on a secondary winding side of a transformer using second through $N^{th}$ output voltage controllers having a simple structure. According to the configurations of the above-described embodiments, the size of each multi-voltage power supply can be significantly reduced compared to conventional current source type power supplies. According to current source type power supplies implemented herein, it was confirmed that the size of the overall multi-voltage power supply circuits is significantly reduced and output voltages can be independently controlled.

Figure 12:
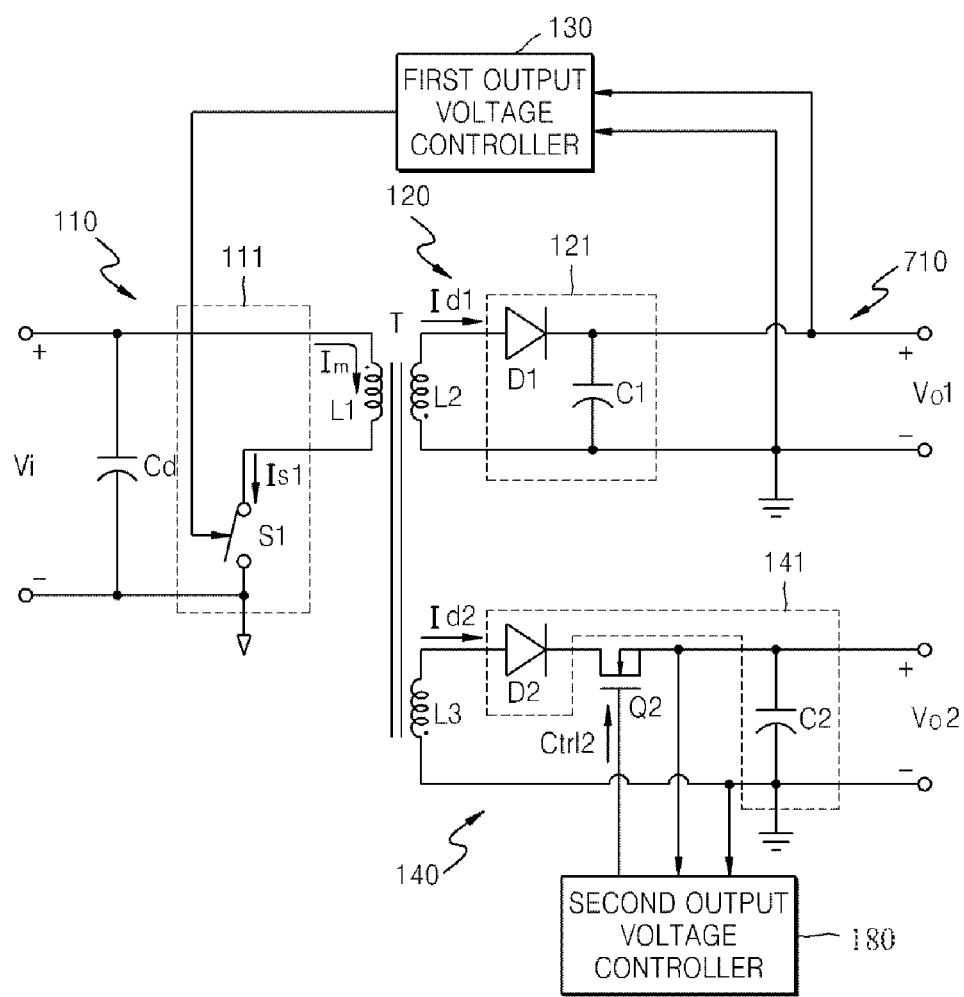
FIG. 12 is a circuit diagram of a multi-voltage power supply according to another embodiment of the present general inventive concept.

FIG. 12 is a circuit diagram of a multi-voltage power supply according to another embodiment of the present general inventive concept. Although a two-voltage power supply is described in the current embodiment, a multi-voltage power supply can be configured to output N (N is a natural number) output voltages according to an implementation environment. If the number of output voltages is N, a transformer includes N secondary coils, and a secondary output circuit can be connected to each of the N secondary coils.

Referring to FIG. 12, the multi-voltage power supply includes a transformer T having a primary coil L1 and two secondary coils, i.e., a first coil L2 and a second coil L3, forming predetermined winding ratios with the primary coil L1. A primary circuit 110 is connected to the primary coil L1, a first output circuit 120 is connected to the first coil L2 in the secondary winding, and a second output circuit 140 is connected to the second coil L3 in the secondary winding. The primary circuit 110 is isolated from the first and second output circuits 120 and 140 of the secondary winding by the transformer T. The primary circuit 110 includes a current source type switching circuit 111 connected to the primary coil L1 of the transformer T. The current source type switching circuit 111 controls a stored energy or transfer operation of the transformer T by performing a switching operation in response to a first control signal applied by a first output voltage controller 130. The current source type switching circuit 111 can include a first control switch S1 connected between the primary coil L1 of the transformer T and a ground. Since the current source type switching circuit 111 is the same as the above description, a detailed description is omitted.

The first output circuit 120 generates a first output voltage $V_{o1}$ by rectifying a voltage transferred to the secondary winding of the transformer T. For the rectification, the first output circuit 120 includes a first rectifier 121 to rectify the voltage. The first rectifier 121 illustrated in FIG. 12 is a half-wave rectifier. In the present embodiment, the first output circuit 120 may include a half-wave or full-wave rectifier. Since the first output circuit 120 is the same as the first output circuit 120 described above, a detailed description is omitted.

The first output voltage controller 130 controls a voltage supplied to the primary winding of the transformer T according to the first output voltage $V_{o1}$ generated by the first output circuit 120. Since the first output voltage controller 130 is the same as the first output voltage controller 130 described above, a detailed description is omitted.

The second output circuit 140 generates a second output voltage $V_{o2}$ by rectifying the voltage transferred from the transformer T. For the rectification, the second output circuit 140 includes a second rectifier 141 and a second switch Q2.

The second rectifier 141 can include a second diode D2 and a second capacitor C2, which are connected in series, and together are connected in parallel to the second coil L3 in the secondary winding of the transformer T, in order to generate the second output voltage $V_{o2}$ by rectifying the voltage transferred from the transformer T. In this case, a second output terminal to output the second output voltage $V_{o2}$ can be formed at both ends of the second capacitor C2.

The second switch Q2 switches an operation of the second rectifier 141 in an active region in response to a switching control signal Ctrl2 applied from a second output voltage controller 180. For the switching operation, the second switch Q2 is disposed between the second diode D2 and the second capacitor C2. The second switch Q2 can be implemented using a MOSFET, a gate of which is connected to an output terminal of the second output voltage controller 180, or a BJT. If the second switch Q2 is implemented using a MOSFET, the second switch Q2 switches an operation of the second rectifier 141 by receiving the linear switching control signal Ctrl2 through the gate of the MOSFET.

The second output voltage controller 180 independently controls the second output voltage $V_{o2}$ by generating the switching control signal Ctrl2 to control the second switch Q2 by feeding back the second output voltage $V_{o2}$ and applying the generated switching control signal Ctrl2 to the second switch Q2. The switching control signal Ctrl2 will be described in detail later.

Figure 13:
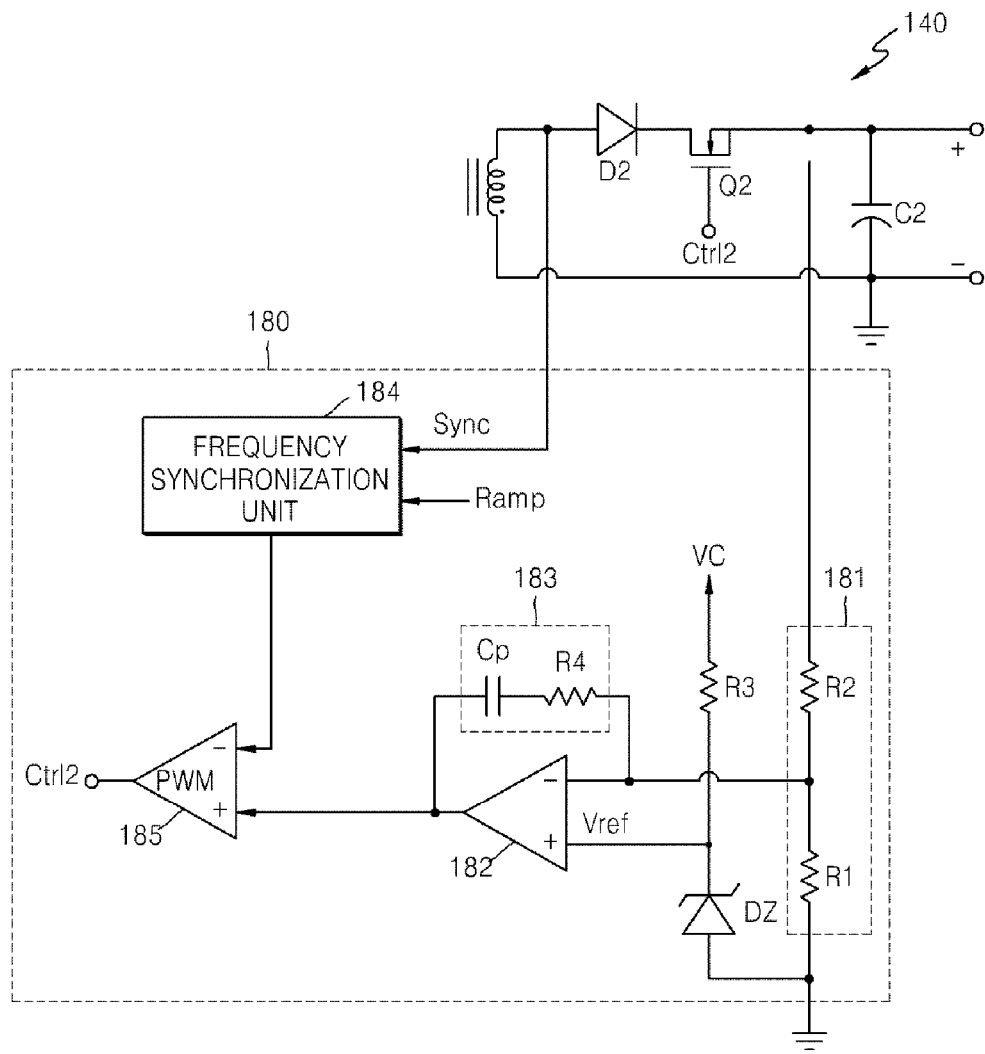
FIG. 13 is a circuit diagram of a second output voltage controller of the multi-voltage power supply of FIG. 12, according to an embodiment of the present general inventive concept.

FIG. 13 is a circuit diagram of the second output voltage controller 180 of the multi-voltage power supply of FIG. 12, according to an embodiment of the present general inventive concept. Referring to FIG. 13, the second output voltage controller 180 can include an output voltage detector 181, an error detector 182, a compensation circuit 183, a frequency synchronization unit 184, and a pulse width modulator (PWM) 185.

The output voltage detector 181 detects the second output voltage $V_{o2}$ in accordance with a predetermined voltage ratio and outputs the detected voltage to the error detector 182. The output voltage detector 181 can include a voltage divider circuit including two resistors, i.e., a first resistor R1 and a second resistor R2.

A predetermined reference voltage $V_{ref}$, e.g., 2.5 V, is input to a first input terminal of the error detector 182. The reference voltage $V_{ref}$ can be generated by a third resistor R3 connected between a voltage source $V_c$ and ground via a zener diode DZ. The voltage detected by the output voltage detector 181 is input to a second input terminal of the error detector 182.

The compensation circuit 183 stabilizes the second output voltage controller 180 by providing a compensation circuit using negative feedback. The compensation circuit 183 may include a fourth resistor R4 and a capacitor $C_p$ connected in series with each other, which are together connected in parallel to the second input terminal and an output terminal of the error detector 182.

The frequency synchronization unit 184 synchronizes a predetermined ramp signal input from the outside with a synch signal detected from a front-end of the second diode D2. The synch signal can denote a square wave having the same frequency as a switching frequency of the first control switch S1 of the primary circuit 110. The ramp signal can denote a signal having a predetermined ramp waveform.

The PWM 185 generates the switching control signal Ctrl2 to control ON/OFF of the second switch Q2 by comparing a signal, i.e., an amplified error value, provided by the error detector 182, to the synchronized ramp signal output from the frequency synchronization unit 184 and applies the generated switching control signal Ctrl2 to the second switch Q2. Herein, the switching control signal Ctrl2 is generated in the same period as that of the synchronized ramp signal, and a delay of the switching control signal Ctrl2 is controlled according to the error value provided by the error detector 182.

Thus, by feeding back the second output voltage $V_{o2}$ and controlling ON/OFF states of the current flowing through the second diode D2 according to the amplitude of the detected second output voltage $V_{o2}$ by using the second output voltage controller 180, the amplitude of a current provided to an output terminal of the second output circuit 140 can be controlled, thereby controlling the second output voltage $V_{o2}$ to have a desired amplitude.

Figure 14:
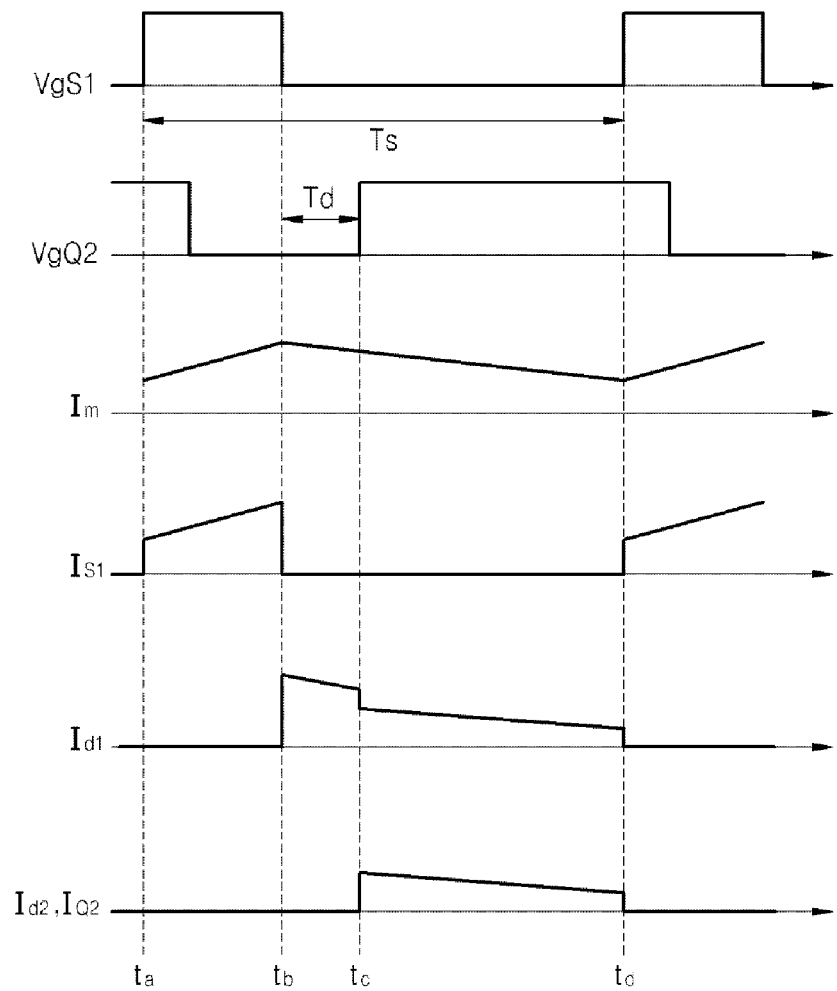
FIG. 14 is a timing diagram illustrating signal transitions according to an operation of the multi-voltage power supply of FIG. 12, according to an embodiment of the present general inventive concept.

FIG. 14 is a timing diagram illustrating signal transitions according to an operation of the multi-voltage power supply of FIG. 12, according to an embodiment of the present general inventive concept.

In FIG. 14, VgS1 denotes a voltage across the first control switch S1, and VgQ2 denotes a gate-source voltage of the second switch Q2. In other words, VgS1 and VgQ2 indicate operation states of the first control switch S1 and the second switch Q2, respectively. For example, if VgS1 or VgQ2 has a high level value, the first control switch S1 or the second switch Q2 is in an ON state, and if VgS1 or VgQ2 has a low level value, the first control switch S1 or the second switch Q2 is in an OFF state. In addition, Ts denotes a switching period of the first control switch S1, and Td denotes a delay time of the second switch Q2.

Referring to FIGS. 12 through 14, an operation of the first control switch S1 can be divided into an ON state duration (between $t_a$ and $t_b$) and an OFF state duration (between $t_b$ and $t_d$) and the ON and OFF state durations are repeated in the period Ts. The second switch Q2 to control the second output voltage $V_{o2}$ repeats ON and OFF states in the same period Ts as the first control switch S1 due to the synchronization. Thus, the second output voltage $V_{o2}$ can be controlled by properly controlling an ON state duration (between $t_b$ and $t_c$) of the second switch Q2 from when a current is transferred to the first and second output circuits 120 and 140 on the second winding side of the transformer T.

If the first control switch S1 is in an ON state, a magnetization inductance current $I_m$ of the transformer T linearly increases, resulting in storage of energy in the form of the magnetization inductance of the transformer T. In this case, a current $I_{d1}$ flowing through the first diode D1 of the first output circuit 120 on the second winding side of the transformer T, a current $I_{d2}$ flowing through the second diode D2 of the second output circuit 140 on the second winding side of the transformer T, and a current $I_{Q2}$ flowing through the second switch Q2 are all 0.

If the first control switch S1 is in an OFF state, a current due to the magnetization inductance of the transformer T is transferred to the first output circuit 120 in the second winding, and the current $I_{d1}$ flowing through the first diode D1 linearly decreases. Thus, the first output voltage $V_{o1}$ is output.

The second switch Q2 turns ON after a predetermined delay time has elapsed according to a feedback value of the second output voltage $V_{o2}$ by control of the second output voltage controller 180, and therefore, a current flows through the second diode D2, thereby outputting the second output voltage $V_{o2}$. If the first control switch S1 turns ON again, even if the second switch Q2 is ON, the currents $I_{d2}$ and $I_{Q2}$ do not flow since the second diode D2 is in an inverse bias state.

Figure 15:
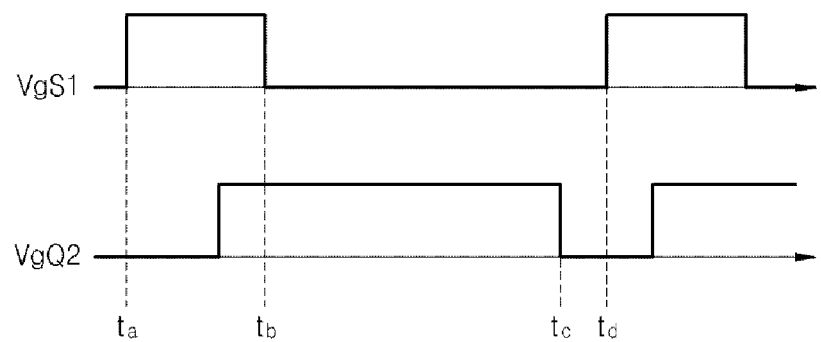
FIG. 15 is a timing diagram illustrating signal transitions according to an operation of the multi-voltage power supply of FIG. 12, according to another embodiment of the present general inventive concept.

FIG. 15 is a timing diagram illustrating signal transitions according to an operation of the multi-voltage power supply of FIG. 12, according to another embodiment of the present general inventive concept.

Referring to FIG. 15, an operation of the first control switch S1 can be divided into an ON duration (between $t_a$ and $t_b$) and an OFF duration (between $t_b$ and $t_d$) and the ON and OFF durations are repeated in the period Ts. The second switch Q2 to control the second output voltage $V_{o2}$ repeats ON and OFF in the same period Ts as the first control switch S1 due to the synchronization.

In the ON duration (between $t_a$ and $t_b$) of the first control switch S1, since a current is not transferred to the secondary winding, an operation of the second switch Q2 does not influence an operation of the multi-voltage power supply. In the OFF duration (between $t_b$ and $t_d$) of the first control switch S1, the second output voltage $V_{o2}$ can be controlled by controlling the timing of a time $t_c$ at which the second switch Q2 is in an OFF state according to a feedback value of the second output voltage $V_{o2}$.

As described above, according to the present embodiment, by delaying the ON or OFF operation state of the second switch Q2 according to the feedback value of the second output voltage $V_{o2}$, the amount of a current flowing through the second output circuit 140 on the second winding side of the transformer T can be controlled, thereby independently controlling the second output voltage $V_{o2}$. Thus, a multi-voltage current source type power supply having a simple structure can be provided.

Figure 16:
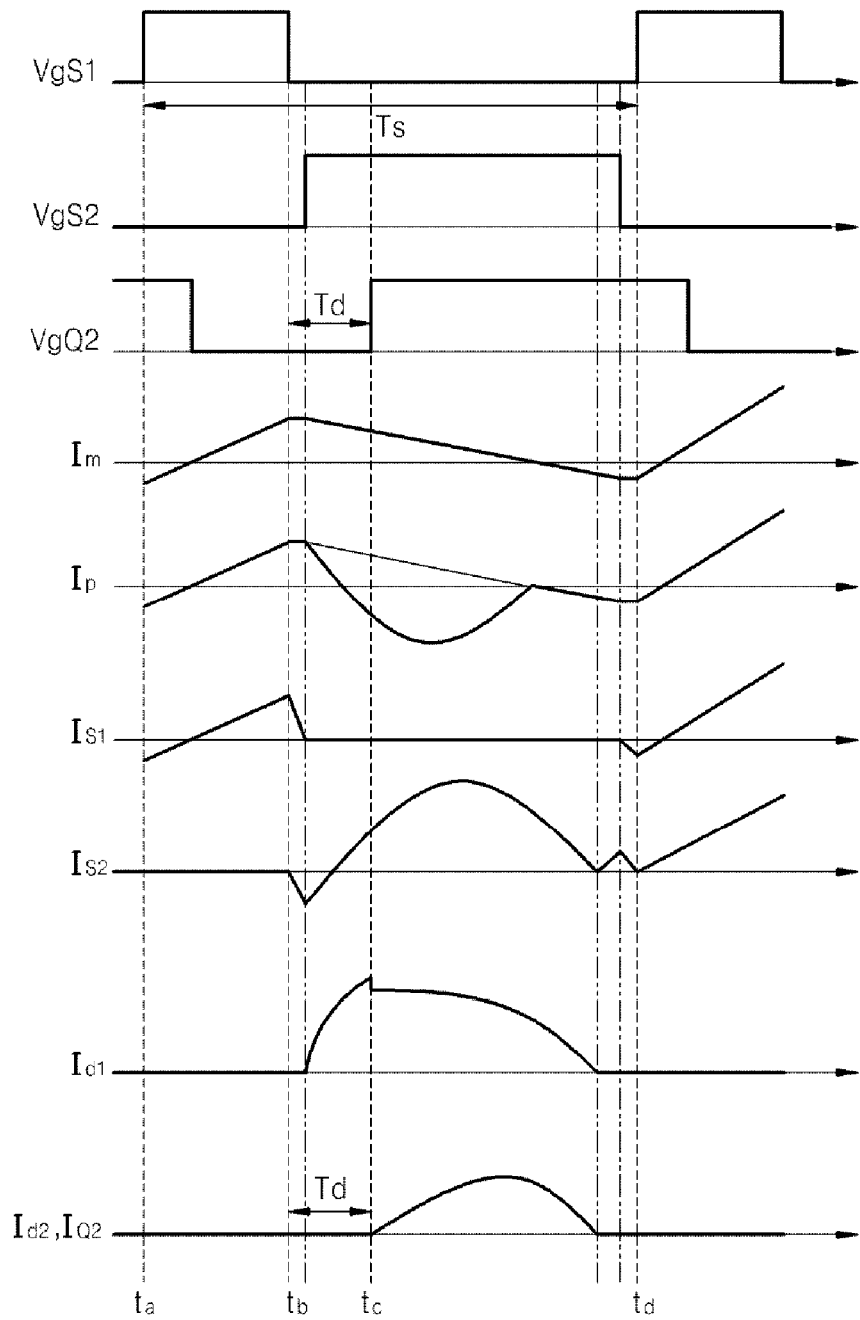
FIG. 16 is a timing diagram illustrating signal transitions according to an operation of the multi-voltage power supply of FIG. 12, according to another embodiment of the present general inventive concept.

FIG. 16 is a timing diagram illustrating signal transitions according to an operation of the multi-voltage power supply of FIG. 12 when the current source type switching circuit 111 of the primary circuit 110 is configured as the active clamp flyback type, according to another embodiment of the present general inventive concept.

In FIG. 16, VgS1 denotes a voltage across the first control switch S1, VgS2 denotes a voltage across the second control switch S2, and VgQ2 denotes a gate-source voltage of the second switch Q2. In other words, VgS1, VgS2, and VgQ2 indicate operation states of the first control switch S1, the second control switch S2, and the second switch Q2, respectively.

Referring to FIGS. 12 and 16, an operation of the first control switch S1 can be divided into an ON duration (between $t_a$ and $t_b$) and an OFF duration (between $t_b$ and $t_d$) and the ON and OFF durations are repeated during the period Ts. The second control switch S2 repeats ON and OFF durations complementarily with the first control switch S1. The second switch Q2 to control the second output voltage $V_{o2}$ repeats ON and OFF durations in the same period Ts as the first control switch S1 due to the synchronization.

The second output voltage $V_{o2}$ can be controlled by properly controlling a delay time Td in an ON duration (between $t_b$ and $t_c$) of the second switch Q2 from when a current is transferred to the first and second output circuits 120 and 140 on the second winding side of the transformer T. In the OFF duration (between $t_b$ and $t_d$) of the first control switch S1, the second control switch S2 is in an ON state and $I_{s2}$ increases, and thereby the leakage inductance resonates through the capacitor $C_c$.

Figure 17A:
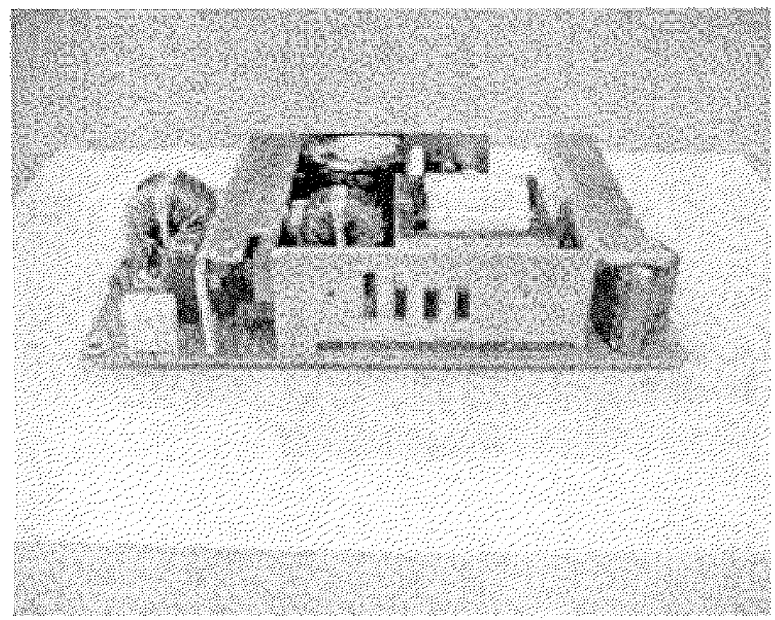
FIGS. 17A and 17B are photographs of a conventional active clamp type power supply and an active clamp type power supply according to an embodiment of the present general inventive concept.
Figure 17B:
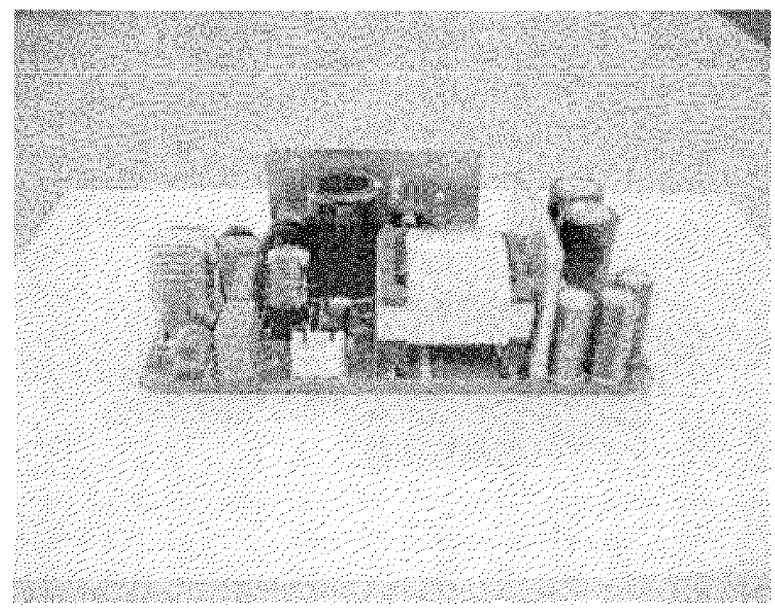

FIGS. 17A and 17B are photographs of a conventional active clamp type multi-voltage power supply and an active clamp type multi-voltage power supply according to an embodiment of the present general inventive concept. FIG. 17A illustrates a shape of the conventional active clamp type multi-voltage power supply, and FIG. 17B illustrates a shape of the active clamp type multi-voltage power supply according to an embodiment of the present general inventive concept. Referring to FIGS. 17A and 17B, the active clamp type multi-voltage power supply illustrated in FIG. 17B has a smaller size and a simpler structure than the conventional active clamp type multi-voltage power supply illustrated in FIG. 17A.

Although the number of output circuits in the secondary winding is illustrated as 2 in the various embodiments described above, it will be understood by those of ordinary skill in the art that a plurality of output circuits on the secondary winding side of the transformer, which are independently controlled, can be configured.

As described above, in a multi-voltage power supply according to the various embodiments of the present general inventive concept, since multiple (at least two) output circuits which are on a secondary winding side of a transformer, for realizing multiple output voltages can be independently controlled, a structure of the output circuits is simple, and a size of the multi-voltage power supply can be significantly reduced. In addition, by linearly controlling the multiple output circuits, the multiple output voltages can be stably controlled regardless of the number of output voltages.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. A two-voltage power supply including a transformer, a first output circuit to generate a first output voltage using a voltage transferred to a secondary winding of the transformer, and a first output voltage controller to control a voltage supplied to a primary winding of the transformer according to the first output voltage, the two-voltage power supply comprising:
    a second output circuit to generate a second output voltage using the voltage transferred to the secondary winding of the transformer; and
    a second output voltage controller to control linearly outputting the second output voltage by feeding back the second output voltage,
    wherein the second output circuit comprises:
        a second rectifier to generate the second output voltage by rectifying the voltage transferred from the transformer; and
        a second switch to linearly switch an output voltage of the second rectifier according to a linear control signal of the second output voltage controller.

2. The two-voltage power supply of claim 1, wherein the second rectifier comprises a second diode and a second capacitor, which are connected in series, and together are connected in parallel to the secondary winding of the transformer, and a second output terminal is formed at both ends of the second capacitor to output the second output voltage.

3. The two-voltage power supply of claim 1, wherein the second rectifier is either a half-wave rectification circuit or a full-wave rectification circuit.

4. The two-voltage power supply of claim 2, wherein the second switch comprises a metal oxide semiconductor field effect transistor (MOSFET), a gate of which is connected to an output terminal of the second output voltage controller and the other terminals of which are connected between the second diode and the second capacitor.

5. The two-voltage power supply of claim 2, wherein the second switch comprises a bipolar junction transistor (BJT).

6. The two-voltage power supply of claim 2, wherein the second switch operates in an active region in which a curve becomes linear in a graph showing a correlation between a current flowing through the second switch and a voltage across the second switch.

7. The two-voltage power supply of claim 1, wherein the second output voltage controller comprises:
    a second reference voltage generator to generate a predetermined reference voltage to be compared to a second output voltage;
    a second error detector to compare the second output voltage to the reference voltage generated by the second reference voltage generator and output an error value according to the comparison result; and
    a second control signal output unit to output the second linear control signal to control the second switch in the active region by voltage-dividing the signal output from the second error detector.

8. The two-voltage power supply of claim 7, wherein the second reference voltage generator comprises a voltage divider circuit, which is connected to a predetermined voltage source and provides the reference voltage to the second error detector by voltage-dividing a voltage of the predetermined voltage source.

9. The two-voltage power supply of claim 7, wherein the second control signal output unit comprises a voltage divider circuit to voltage-divide the signal output from the second error detector.

10. The two-voltage power supply of claim 7, wherein the second output voltage controller further comprises a second compensation circuit to provide a compensation circuit using negative feedback, the second compensation circuit being connected in parallel to an output terminal of the second error detector and an input terminal of the second error detector to which the second output voltage is applied and comprising a resistor and a capacitor, which are connected in series.

11. The two-voltage power supply of claim 1, wherein the transformer comprises a primary circuit having a current source type switching circuit, which comprises a first switch to perform a switching operation using a first control signal input from the first output voltage controller.

12. The two-voltage power supply of claim 11, wherein the current source type switching circuit is configured as one of a flyback type, an active clamp flyback type, a half-bridge flyback type, and a series resonance type.

13. The two-voltage power supply of claim 11, wherein the current source type switching circuit further comprises a snubber circuit to prevent a leakage inductance of the transformer.

14. The two-voltage power supply of claim 1, wherein the first output circuit comprises a rectifier to rectify the voltage transferred from the transformer.

15. The two-voltage power supply of claim 14, wherein the rectifier is either a half-wave rectification circuit or a full-wave rectification circuit.

16. An image forming device comprising a two-voltage power supply including a transformer, a first output circuit to generate a first output voltage using a voltage transferred to a secondary winding of the transformer, and a first output voltage controller to control a voltage supplied to a primary winding of the transformer according to the first output voltage, the two-voltage power supply comprising:
  a second output circuit generate a second output voltage using the voltage transferred to the secondary winding of the transformer; and
  a second output voltage controller to control linearly outputting the second output voltage by feeding back the second output voltage,
  wherein the second output circuit comprises:
  a second rectifier to generate the second output voltage by rectifying the voltage transferred from the transformer; and
  a second switch to linearly switch an output voltage of the second rectifier according to a linear control signal of the second output voltage controller.

17. A two-voltage power supply including a transformer, a first output circuit to generate a first output voltage using a voltage transferred to a secondary winding of the transformer, and a first output voltage controller to control a voltage supplied to a primary winding of the transformer according to the first output voltage, the two-voltage power supply comprising:
  a second output circuit to generate a second output voltage using the voltage transferred to the secondary winding of the transformer; and
  a second output voltage controller to control outputting the second output voltage according to a switching operation by feeding back the second output voltage,
  wherein the second output circuit comprises:
    a second rectifier to generate a second output voltage by rectifying the voltage transferred from the transformer; and
    a second switch to switch an output voltage of the second rectifier according to a switching control signal of the second output voltage controller, and
  wherein the second output voltage controller comprises:
    a second output voltage detector to detect the second output voltage;
    a second error detector to compare the second output voltage detected by the second output voltage detector to a predetermined reference voltage and output an error value according to the comparison result;
    a second frequency synchronization unit to synchronize a ramp signal provided from the outside with a switching frequency of the primary winding of the transformer; and
    a second pulse width modulator (PWM) to compare the signal output from the second error detector to the synchronized ramp signal output from the second frequency synchronization unit and output the switching control signal to control a switching operation of the second switch.

18. The two-voltage power supply of claim 17, wherein the second rectifier comprises a second diode and a second capacitor, which are connected in series, and together are connected in parallel to the secondary winding of the transformer, and a second output terminal is formed at both ends of the second capacitor to output the second output voltage.

19. The two-voltage power supply of claim 17, wherein the second rectifier is either a half-wave rectification circuit or a full-wave rectification circuit.

20. The two-voltage power supply of claim 18, wherein the second switch comprises a metal oxide semiconductor field effect transistor (MOSFET), a gate of which is connected to an output terminal of the second output voltage controller and the other terminals of which are connected between the second diode and the second capacitor.

21. The two-voltage power supply of claim 18, wherein the second switch comprises a bipolar junction transistor (BJT).

22. The two-voltage power supply of claim 17, wherein the second output voltage detector is a voltage divider circuit.

23. The two-voltage power supply of claim 22, wherein the reference voltage is generated by a resistor and a zener diode, which are connected between a predetermined voltage source and ground.

24. The two-voltage power supply of claim 17, wherein the second output voltage controller further comprises:
  a second compensation circuit to provide a compensation circuit using negative feedback, the second compensation circuit being connected in parallel to an output terminal of the second error detector and an input terminal of the second error detector to which the second output voltage is applied and comprising:
  a resistor and a capacitor, which are connected in series.

25. The two-voltage power supply of claim 17, wherein a primary circuit of the transformer comprises a current source type switching circuit, which comprises a first switch performing a switching operation using a first control signal input from the first output voltage controller.

26. The two-voltage power supply of claim 25, wherein the current source type switching circuit is configured as one of a flyback type, an active clamp flyback type, a half-bridge flyback type, and a series resonance type.

27. The two-voltage power supply of claim 25, wherein the current source type switching circuit further comprises:
a snubber circuit to prevent a leakage inductance of the transformer.

28. The two-voltage power supply of claim 17, wherein the first output circuit comprises a rectifier to rectify the voltage transferred from the transformer.

29. The two-voltage power supply of claim 28, wherein the rectifier is either a half-wave rectification circuit or a full-wave rectification circuit.

30. An image forming device comprising a two-voltage power supply including a transformer, a first output circuit to generate a first output voltage using a voltage transferred to a secondary winding of the transformer, and a first output voltage controller to control a voltage supplied to a primary winding of the transformer according to the first output voltage, the two-voltage power supply comprising:
a second output circuit to generate a second output voltage using the voltage transferred to the secondary winding of the transformer; and
a second output voltage controller to control outputting the second output voltage according to a switching operation by feeding back the second output voltage,
wherein the second output circuit comprises:
a second rectifier to generate the second output voltage by rectifying the voltage transferred from the transformer; and
a second switch to switch an output voltage of the rectifier according to a switching control signal of the second output voltage controller,
wherein the second output voltage controller comprises:
a second output voltage detector to detect the second output voltage;
a second error detector to compare the second output voltage detected by the second output voltage detector to a predetermined reference voltage and output an error value according to the comparison result;
a second frequency synchronization unit to synchronize a ramp signal provided from the outside with a switching frequency of the primary winding of the transformer; and
a second pulse width modulator (PWM) to compare the signal output from the second error detector to the synchronized ramp signal output from the second frequency synchronization unit and output the switching control signal to control a switching operation of the second switch.

* * * * *